United States Patent
Brhmadesam et al.

(10) Patent No.: US 12,020,556 B2
(45) Date of Patent: Jun. 25, 2024

(54) METHOD AND SYSTEM FOR REAL-TIME CROSS-VERIFICATION OF ALARMS

(71) Applicant: Infosys Limited, Bangalore (IN)

(72) Inventors: Sateesh Brhmadesam, Bangalore (IN); Sridhar Chidambaram, Bangalore (IN); Chinmay Kargutkar, Thane (IN); Ravi Kumar Gvv, Bangalore (IN)

(73) Assignee: Infosys Limited, Bangalore (IN)

( * ) Notice: Subject to any disclaimer, the term of this patent is extended or adjusted under 35 U.S.C. 154(b) by 274 days.

(21) Appl. No.: 17/510,899

(22) Filed: Oct. 26, 2021

(65) Prior Publication Data
US 2023/0015468 A1    Jan. 19, 2023

(30) Foreign Application Priority Data
Jul. 8, 2021  (IN) .............................. 202141030714

(51) Int. Cl.
*G08B 29/18* (2006.01)
*G06N 20/00* (2019.01)

(52) U.S. Cl.
CPC ........... *G08B 29/185* (2013.01); *G06N 20/00* (2019.01)

(58) Field of Classification Search
CPC ..... G08B 29/185; G08B 29/186; G06N 20/00
See application file for complete search history.

(56) References Cited

U.S. PATENT DOCUMENTS 7,043,661 B2 *  5/2006  Valadarsky ......... H04L 41/0604
                                                                702/59

* cited by examiner

*Primary Examiner* — Walter L Lindsay, Jr.
*Assistant Examiner* — Geoffrey T Evans
(74) *Attorney, Agent, or Firm* — Troutman Pepper Hamilton Sanders LLP (Rochester)

(57) ABSTRACT

A method and system for cross-verification of alarms in real-time comprising identifying primary variables and secondary variables causing the event, labelling the primary variables and the secondary variables by primary engine and secondary engine based on Artificial Intelligence based predictive model building, predicting the labels by one or more inference engine based on previous history and data patterns, triggering secondary engine for cross-verification of alarms whenever there is a prediction from the primary engine, identifying the correlation between the labels from the primary engine and the secondary engine by validation engine, identifying alarm type based on correlation, recommending predictive maintenance and displaying on dashboard the cross-verification status of the alarms. The method reduces misclassification of alarm types based on predictive or preventive maintenance, reduces the maintenance costs of assets, and helps in prioritizing the critical alarms based on the alert type.

14 Claims, 6 Drawing Sheets

| Primary variable Alarm Engine Predictions | | Secondary variable based Predictions | Alarm Specific | Alarm level |
|---|---|---|---|---|
| Reading no | Predicted Label | Predicted Label | Confirmation | Alert result |
| 1 | Type A | Type A | Confirm 1: 100% | Alarm generated is correct |
| 2 | Type B | Type B | Confirm 1: 100% | Alarm generated is correct |
| 3 | Type A | Type B | Confirm 3: 90% | Alarm generated is correct |
| 4 | Type B | Type A | Confirm 2: 95% | Alarm generated is correct |
| 5 | Type A | Type n | near to get affected | Alarm generated is outlier |
| 6 | Type B | Type n | near to get affected | Alarm generated is outlier |

METHOD AND SYSTEM FOR REAL-TIME CROSS-VERIFICATION OF ALARMS

This application claims the benefit of Indian Patent Application Serial No. 202141030714, filed Jul. 8, 2021, which is hereby incorporated by reference in its entirety.

FIELD

Examples of this technology relate to verification of alarms and more particularly to a cross-verification of alarms received from events in real-time to avoid misclassification of alarm types based on predictive or preventive maintenance.

BACKGROUND

Alarms triggered by sensors of the alarm systems are very important for the organizations. The sensors data from the events are analyzed to identify the problems occurred in machines or devices. Many times, the alarms triggered are in huge numbers and are very expensive in rectifying these alarms. There can be false alarms which may occur due to technical failures, downtimes, and human errors. These alarms are to be rectified without any delay, otherwise there may be huge loss to the organizations, especially in case of critical alarms. Also, these alarms must be attended by the technicians at right time. Hence there is a need to cross verify the alarms before being attended by the right technicians.

Each alarm indicates some problem, which can be attended by skilled technicians who are expert in the domain. If there is a mismatch in the type of alarms received and if the alarm is sent to wrong technicians, then there will be delay in resolving the problems in the events. Also, the cost involved in rectifying the problem increases. The situation becomes still worst when there is a critical alarm. Consider for example if there is an alarm received from e.g. motor and compressor, both are problems alarms but, if there is mismatch to fix it, then there will be waste of time and money. Hence there is need to identify the type of the alarms received and to cross verify the alarms before being attended by the experts. Manual cross verification of alarms is very difficult, and the task becomes very tedious when the alarms received are in huge numbers, there may be mismatch during verification. The current approaches do not rectify the misclassification of alerts. There is a need to cross verify the alarms by Artificial Intelligence (AI) and Machine Learning techniques (ML) Systems. Hence, there is a need for a method and system which can overcome the above-mentioned problems.

SUMMARY

Disclosed is a method and system for cross-verification of alarms in real-time. The method comprising receiving normal data and incident data from equipment for preventive and predictive maintenance of events, identifying one or more primary variables and one or more secondary variables causing the event based on incident data, labelling the one or more primary variables and one or more secondary variables by primary engine and secondary engine based on Artificial Intelligence (AI) based predictive model building, predicting one or more label for one or more primary variables and one or more label for one or more secondary variables by one or more inference engine based on previous history and data patterns, triggering secondary engine for cross-verification of alarms if there is an alarm from the primary engine, identifying the correlation between the one or more label from the primary engine and the one or more label form the secondary engine by validation engine, identifying type of alarm based on correlation of the one or more primary labels and the one or more secondary labels, recommending predictive maintenance based on the identified type of alarm and displaying on dashboard the cross-verification status of the alarms.

A system for cross-verification of alarms in real-time, the system comprising at least one processor, and memory containing instructions, the instructions being executable by the at least one processor. The system comprising a receiving module for receiving incident data from equipment for preventive and predictive maintenance of events. A correlation module for identifying one or more primary variables and one or more secondary variables causing the event based incident data. A primary engine and a secondary engine for labelling the one or more primary variables and one or more secondary variables based on AI based predictive model building. A first inference engine and a second inference engine for predicting one or more label for one or more primary variables and one or more secondary variables based on previous history and data patterns. The primary engine triggers the secondary engine for cross-verification of alarms if there is an alarm from the primary engine. A validation engine comprising, identifying the correlation between the one or more label from the primary engine and the one or more label form the secondary engine, identifying type of alarm based on correlation of labels, and recommending predictive maintenance based on the identified type of alarm. A dashboard for displaying the status of the alarms after cross-verification.

The method, the system, and/or the apparatus computer readable storage medium disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

One of the exemplary objectives of an example of the present disclosure is to overcome the technical problem mentioned in the background section through a method and system for real-time cross-verification of alarms, as described in various embodiments of the present disclosure. The method and system reduce misclassification of alarm types based on predictive and preventive maintenance. Maintenance costs of the assets are reduced by avoiding the misclassification of alerts. It helps in prioritizing critical alarms based on the alert type. The cross verification of alarms helps in sending the right alarm to right technician for maintenance. The alarms data are displayed on dashboard, so that the alarms can be notified to the right technicians. The technicians can attend the problem without any mismatch, as the cross-verification of alarms are already done.

One of the exemplary objects of examples of this technology is to cross-verification of alarms in real-time. Another exemplary object of examples of this technology is to identify primary and secondary variables causing the alarms using snowballing effects. In another object, examples of this technology classify the alarms into multiple groups or sub-groups and issue alerts for the same and cross check the type of classification of the alert. Yet another exemplary object of examples of this technology is to develop an inference from the predictions of a primary engine and a secondary engine. Yet another exemplary object of examples of this technology is to reduce misclassification of alarm types using secondary variables. Yet another object of examples of this technology is to classify alarm types based on conditional probabilities of Bayesian using Nash Equilibrium.

Figure 1:
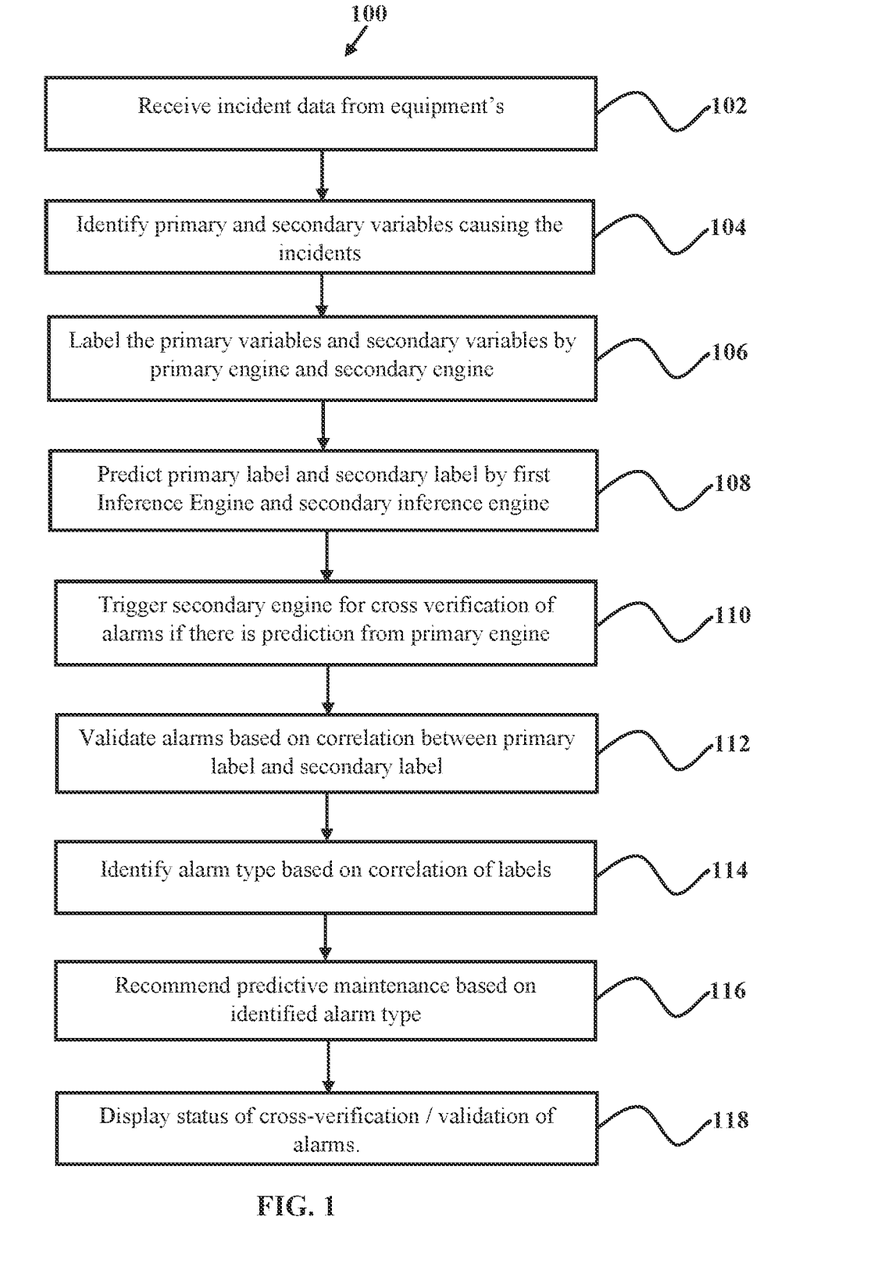
FIG. 1 shows a flow diagram, illustrating a method for cross-verification of alarms in real-time, according to one or more embodiments.

FIG. 1 shows a flow diagram, illustrating an exemplary method 100 for cross-verification of alarms in real-time, according to an embodiment of examples of this technology. The method 100 comprising receiving normal data and incident data from equipment for preventive and predictive maintenance of events (102), identifying one or more primary variables and one or more secondary variables causing the event based incident data (104), labelling the one or more primary variables and one or more secondary variables by primary engine and secondary engine based on Artificial Intelligence (AI) based predictive model building (106), predicting one or more label for one or more primary variables and one or more label for one or more secondary variables by one or more inference engine based on previous history and data patterns (108), triggering the secondary engine for cross-verification of alarms if there is an alarm from the primary engine (110), identifying by a validation engine, the correlation between the one or more label from primary engine and the one or more label form secondary engine (112), identifying the type of alarm based on the correlation of the one or more label (114), recommending predictive maintenance based on the identified type of alarm (116) and displaying on the dashboard the cross-verification status of the alarms (118).

Figure 2:
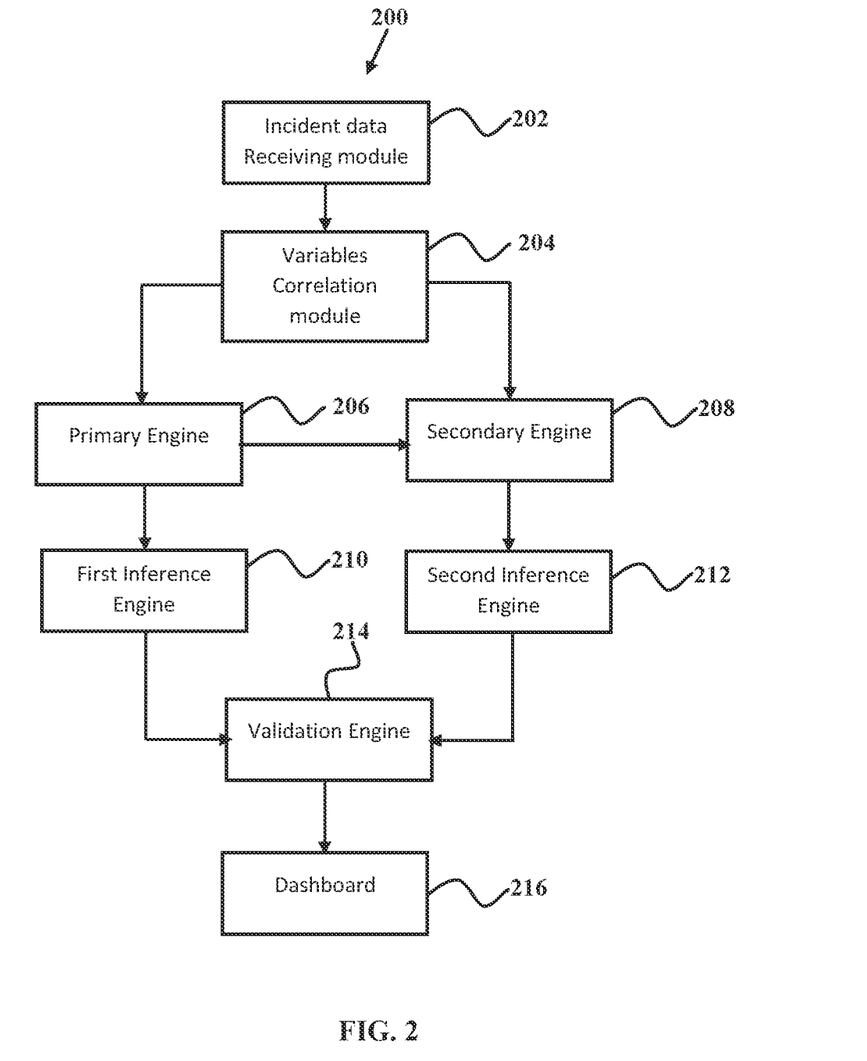
FIG. 2 shows a block diagram, illustrating a system for cross verification of alarms in real-time, according to one or more embodiments.

FIG. 2 shows a block diagram, illustrating an exemplary system 200 for cross verification of alarms in real-time, according to an embodiment of examples of this technology. The system 200 comprising at least one processor; and memory containing instructions, the instructions being executable by the at least one processor. It includes a receiving module 202 for receiving incident data and normal data from equipment for preventive and predictive maintenance of events. A variables correlation module 204 for identifying the one or more primary variables and one or more secondary variables causing the event based on the incident data. The primary engine 206 and the secondary engine 208 for labelling the one or more primary variables and the one or more secondary based on AI based predictive model building. The first inference engine 210 and the second inference engine 212 predicts the one or more label of the one or more primary variables and the one or more secondary variables based on previous history and data patterns. Whenever there is a prediction from the primary engine 206, the primary engine 206 triggers the secondary engine 208 for cross-verification of alarm. The validation engine 214 comprising, identifying the correlation between the one or more label from the primary engine 206 and the one or more label form the secondary engine 208, identifying the type of alarm based on correlation of labels, and recommending predictive maintenance based on the identified type of alarm. A dashboard 216 for displaying the status of the alarms after the cross-verification.

Figure 3:
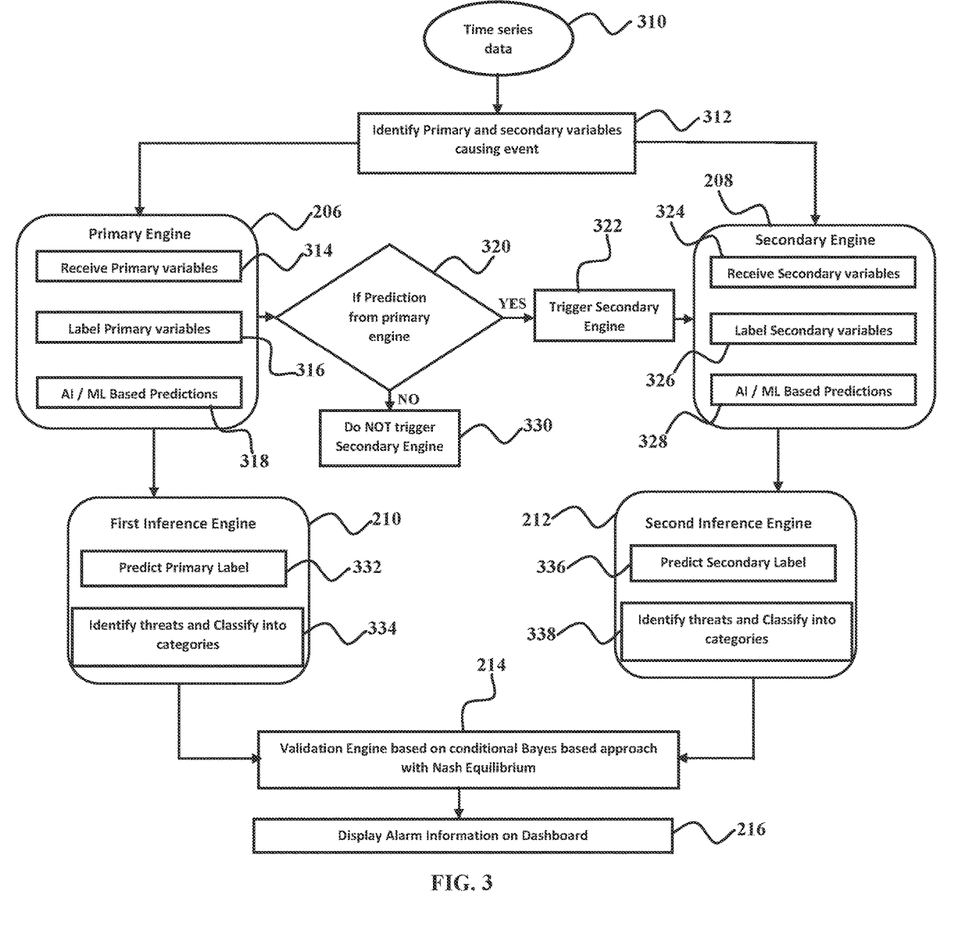
FIG. 3 shows a flow chart, illustrating a method for cross-verification of alarms in real-time, according to one or more embodiments.

FIG. 3 shows a flow chart, illustrating an exemplary method 100 for cross-verification of alarms in real-time, according to an embodiment of examples of this technology. The real-time event data or time series data (310) is extracted from the sensors. The event data will be automatically downloaded by cross-verification system 200 and the data will be cleansed to deal with missing values. From the real-time event data, the primary variables and the secondary variables responsible for causing the events are identified based on the snowball effect (312). The variables contributing to the event may differ from one event to another event. According to an embodiment the primary variables predicts the alarms based on model building and the secondary variables are used to identify the impact of the alarms. The secondary variables are used for cross verification of alarms, as the secondary variables has same impact or degradation on the event, but to lesser extent compared to the primary variables.

According to an embodiment, the method for identifying the primary variables and the secondary variables comprising extracting the variables causing the event, identifying a data patterns associated with the variables based on Machine learning, identifying contribution of variables based on regression method, identifying correlation between the one or more variables based on contribution of each variable and identifying the primary variables and secondary variables based on the occurrence of events. The event may be any problem, issues, and faults. Consider for example, if there are 10 variables v1 to v10 which are causing the alarms based on the historic patterns, then the variables v1 to v10 are considered as working variables. Then the variables are extracted, and a statistical correlation is done to identify the variables contributing to the specific event. In the example embodiment, it is found that the variables v1, v2, v3 and v4 are contributing directly to the event in chiller machine. By applying snowballing effect, If the correlation of the variables with the event are in very high range (for example 98-100%) for the specific event, then it is considered as primary variable v1 and v2. If the correlation of the variables with the event are in mid-range (for example 70-80%), then it is considered as the secondary variables v3 and v4, as the patterns are impacting the event. If the correlation of the variables v5, v6, v7, v8, v9 and v10 are almost close to primary variables, that means it is next to very high range (example 80-97%), as the patterns will be similar among these variables, then ignoring it for cross verification of the alarms.

After identifying the primary variables and the secondary variables, the variables are labelled. According to an embodiment, the primary variables are received (314) by primary engine 206, then the primary variables are labelled (316) and predictions are done based on AI/ML technique (318). The secondary variables are received (324) by secondary engine 208, then the secondary variables are labelled (326) for predicting the alarms based on AI/ML technique (328).

Below table shows a labelling of the primary variables and the secondary variables, according to an embodiment of examples of this technology.

| | | Primary variables | |
|---|---|---|---|
| Sl no | v1(numeral value) | v2(numeral value) | Label |
| 1 | Xa | xb | Type A |
| 2 | X | Y | Type n |
| 3 | Xc | Xd | Type B |

| | | Secondary variables | |
|---|---|---|---|
| Sl no | V3(numeral value) | V4(numeral value) | Label |
| 1 | xa | xb | Type A |
| 2 | X | y | Type n |
| 3 | xc | xd | Type B |

As shown in above table for the example embodiment, only four variables are considered for labelling. The labelling is done for both the primary variables and the secondary variables separately, so that the event label is predicted for primary variables dataset, and same event label is predicted in secondary variable dataset for the cross-verification of predictions. The primary variables v1 and v2 will be input to the primary engine and the secondary variables will be input to secondary engine for labelling. Then the issues in the primary variables are identified and labelled as Type A, Type B and Type n by the primary engine. Similarly, the issues in the secondary variables are identified and labelled as Type A, Type B and Type n by the secondary engine. The Type A indicates that most of the components have degraded functioning and needs maintenance. The Type B indicates that all of the components have degraded functioning and needs immediate maintenance and the Type n indicates that all of the components are outliers or anomalies.

The primary variables and the secondary variables are input to the machine learning model to predict the label. Consider for example, if there are 100 records that is received from the prediction, then 80 records are input for training and 20 records are input to secondary engine. Similarly, every 20 records are extracted from the new time series dataset are input to the secondary engine 208 to predict the label with error. Once predictions are done at the primary engine (320), the secondary engine 208 will be triggered (322). Similarly, at secondary engine the predictions are done, so that the outliers are differentiated. If there are no predictions in the primary engine then there will be no trigger to secondary engine (330).

After labelling, the primary labels are compared with the secondary labels. Whenever any event occurs, the specific variables, readings and observations from the primary engine 206 are compared with the outcomes of the secondary engine 208. The priority is given to predictive maintenance in the primary engine 206 based on the primary variables. The magnitude value is used to express the degradation values of the variables. According to an example embodiment, based on the problem or alarms, 4 variables are assessed, and the variable values are defined as 0, 1, 2. If the variable values is '0,' that means the machine is switched off or in standby mode. If the variable values is '1' then it means the machine is working. If the variable values is '2' that means, it means there is an issue in machine. Similarly, based on the problem alarms more variables and values can be configured. In the example embodiment, there are only 3 limits or labelling e.g.: above normal, below normal and outlier. Hence based on the number of variables the limits or labelling can be configured. When issue Type A occurs, it means the issue has become serious as most of its components have degraded functioning, so that it needs maintenance. When issue Type B occurs, it means the issue has become serious as all of its components have degraded functioning, so that it needs immediate maintenance.

As the machines are very complex systems, there are chances that before the alarm is received, there may be sudden changes in the value of variable and again values may come to normal range. This may be applicable for both Type A and Type B issues. Hence based on the type of issue predictive maintenance can be done for a predefined number of days. If Type B issue is predicted, then the maintenance must be done in 7 days. If Type A issue is followed by Type B issue or vice versa occurs then the maintenance must be done in 7 days. In this condition, Type A may get transformed to Type B or Type B issue may be transformed to Type A issue. There are chances that some error may occur in predicting the type A or Type B issue. If Type B issue is getting repeated in 15 days, maintenance activity to be done in 7 days. If Type A is getting repeated for 7 days, maintenance must be done in 10 days. The maintenance period can be configured for predictions based on the severity of the issue indicated by specific type of alarm.

Whenever an event occurs, the alarms are generated based on the impact, then the alarms data may be input to primary engine for predictions and the secondary engine for diagnostics. There may be some incidence wherein the Type A is predicted as Type B or Type B may be predicted as Type A, this can be rectified by comparing the alarms with secondary engine only when the alarms are generated from primary engine for the given specific records, observations, and readings.

After labelling, the outputs predicted from the primary engine 206 and the secondary engine 208 are analyzed by the one or more artificial intelligence-based inference engine. The first inference engine 210 receives predictions from the primary engine 206. The first inference engine 210 predicts primary label (332) and identifies whether the predictions are correct or not. It tracks the patterns and identifies whether the current patterns are similar to historic events. The verification of events are done based on historic predictions and data patterns. The first inference engine 210 identifies the threats and classifies in to categories (334), it outliers and alarms and gives recommendations whenever the maintenance activity is to be done.

Similarly, the second inference engine 212 receives predictions from secondary engine 208. The second inference engine 212 predicts secondary label (336) an identifies whether the predictions are correct or not. The second inference engine 212 tracks the patterns and identifies whether the current patterns are similar to historic events. The verification of events is done based on historic predictions and data patterns. The second inference engine 212 identifies the outliers and classifies in to categories (318) and gives recommendations whenever the maintenance activity must be done. The predictions from the first inference engine 210 and second inference engine 212 are fed to validation engine 214. The output from first inference engine 210 and second inference engine 212 are cross verified by the validation engine 214. The validation engine 214 works based on conditional probability using Nash Equilibrium. It classifies the type of alarms based on magnitude. Then the alarms will be sent to operator with recommendations and further actions. The recommendation may be to do maintenance of the system for number of days, if a specific alarm is generated after validation of the given predictions.

According to an embodiment, the labels of the primary variable prediction result and the labels of the secondary variable prediction results are compared by applying conditional probability for cross-verification of predictions. According to an example embodiment, the probability that Event A or the primary variable prediction label occurs, given that Event B or secondary variable prediction label has occurred, is called a conditional probability. The conditional probability of Event A, given Event B, is denoted by the symbol P(A|B). The event labels are predicted using primary variables dataset and the same event label is predicted in secondary variable dataset for cross-verification of predictions.

The probability that Events A and B both occur is the probability of the intersection of A and B. The probability of the intersection of Events A and B is denoted by P(A∩B). It means it can be full or partial elements are present in both sets. The probability of an event ranges from 0 to 1. The sum of probabilities of all possible events equals 1.

The probability that Events A and B both occur is equal to the probability that Event A occurs times the probability that Event B occurs, given that A has occurred. Conditional Probability:

$$P(A \cap B) = P(A)P(B|A)$$

P(A)=1
P(B)=1
Like, for example, Event (A)=Event (B)
P(AB)=P(A)=P(B)
Consider for example, the number of primary variables and label as,
Primary variables–Core=2
Primary variables label=1 (Label1)

Total variables=2(Primary variables–Core)+1(Label1)=3 variables

Similarly, the secondary Variables and label can be considered as,
Secondary variables–Core=2
Secondary variables label=1 (Label2)

Total variables=2(Secondary variables–Core)+1(Label1)=3 variables

In the example embodiment, 2 labels and 4 combinations are considered and hence there will be 4 core conditional probabilities. There are 4 core variables and 2 labels, The appearance of 2 labels and 4 variables and their relation with one another are considered, hence there are four combinations of conditional probability. Consider for example if we are interested in the appearance of A and B pairings and not others like, A with n type and B with n type, it means the readings or observations based probabilities are 4 condition based probabilities to be based on equality and 2 default probabilities of occurrence, these default cases can be given in programming with minimal logical reasoning and hence not considered for conditional probabilities.

The conditional probabilities are used to compute the intersection of 4 condition-based probability events. The probability of the intersection of two events may be expressed as, $$P(A \cap B) = P(A)P(B/A) = P(B)P(A/B)$$

Conditional Probability $$P(A \cap B) = P(A)P(BA)$$

The P(A) is known as the prior probability of A, as it captures the information. P(A/B) is known as the posterior probability. These are fundamental quantities of Bayesian models. Generalizing to a sequence of events gives the chain rule, which allows to express the probability of the intersection of multiple events in terms of conditional probabilities. According to example embodiment only core 4 conditional probabilities and 2 labels are considered for the substituting in the derivation.

Figure 4:
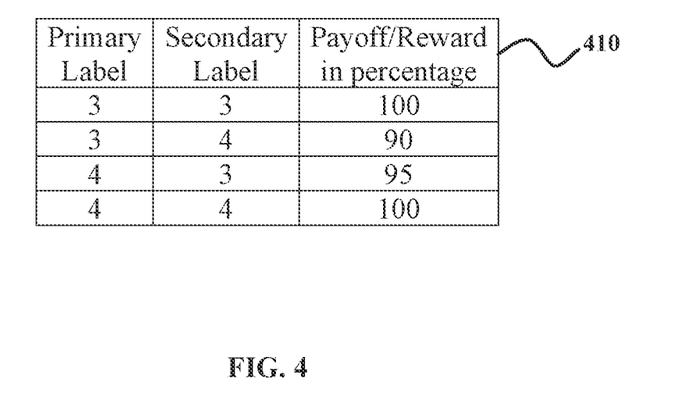
FIG. 4 shows a table, illustrating a method for identifying payoff or rewards based on Nash Equilibrium for on one or more primary labels and one or more secondary labels, according to one or more embodiments.

FIG. 4 shows a table illustrating a method for identifying payoff or rewards 410 magnitude based on one or more primary labels and one or more secondary labels, according to an embodiment of examples of this technology. Considering 4-core condition-based probabilities, Pay-Off or rewards 410 magnitude for the combinations is identified as shown in FIG. 4. The results are substituted to a game-theory based system using Nash Equilibrium.

According to an embodiment, a dataset is divided into two different datasets based on the nature after analysis and are named as primary variables data set and secondary variables dataset, which may be considered for analysis. The primary variables dataset are for predicting the actual results and the secondary variables dataset for generating the predictions which will be taken along with primary predictions for cross-verification of results at the Validation Engine 214. The proposed approach is based on mixed strategy of Nash Equilibrium.

Computing Nash equilibrium with respect to our approach and providing the rewards/pay-offs 410 as shown in FIG. 4.

|  |  | Secondary Variables | |
|---|---|---|---|
| Primary |  | 3 | 4 |
| Variables | 3 | $3^3$ | $3^4$ |
|  | 4 | $4^3$ | $4^4$ |

The same Payoff/Rewards 410 table logic is taken for Alert Engine with 4 core condition probabilities which are:

$$P(A) = P(B) = 1$$

$$P(B) = P(A) = 1$$

$$P(A\backslash B) = 0.95$$

$$P(B\backslash A) = 0.90$$

Considering only core 4 conditional probabilities, the probability of occurrence of label A and label B are:
P(A)=P(B)=1, indicates the events which have the same chance of occurring, it means elements in both sets are same, so resultant labels of both predictions of the primary variables and the secondary variables are same, hence both labels are same.

P(B)=P(A)=1, indicates events which have the same chance of occurring, it means elements in both sets are same, so resultant labels of both predictions of the primary variables and the secondary variables are same, hence both labels are same.

P(A\B)=0.95, indicates that the elements in both sets are almost same, so resultant labels of both predictions of the primary variables and secondary variables are almost near. Hence both the labels are almost same but with little difference.

P(B\A)=0.90, indicates that both labels are almost same but with little difference than the above condition, it means elements in both sets are almost same but with little less than the above condition, so resultant labels of both predictions of the primary variables and the secondary variables are almost near.

According to an embodiment, the default probability conditions are added as constants as these are default conditions to be used in developing the system and method of examples of this technology.

$$A^c = S \backslash A \neq 1$$

$$B^c = S \backslash B \neq 1$$

According to an embodiment, whenever there is an alarm from primary engine 206 then only, the comparison is done with the predictions of alarms with secondary engine 208 for the given specific records/observations/readings. The secondary engine 208 uses diagnostic based system for cross verification of alarms from primary engine 206 or predictive engine. The predictions from primary engine 206 is input to first inference engine 210. The predictions from secondary engine 208 is input to second inference engine 212 and the output of both inference engines is given to 3rd inference engine or validation engine 214. The validation engine 214 cross verifies the alarms. The types of alarms are identified based on the obtained data patterns. The validation engine 214 includes comparison matrix for classification of right alarms types based on the conditional probabilities of Bayesian using Nash Equilibrium or game theory. The magnitude of the alarms are used to express the degradation values of the variables.

Figure 5:
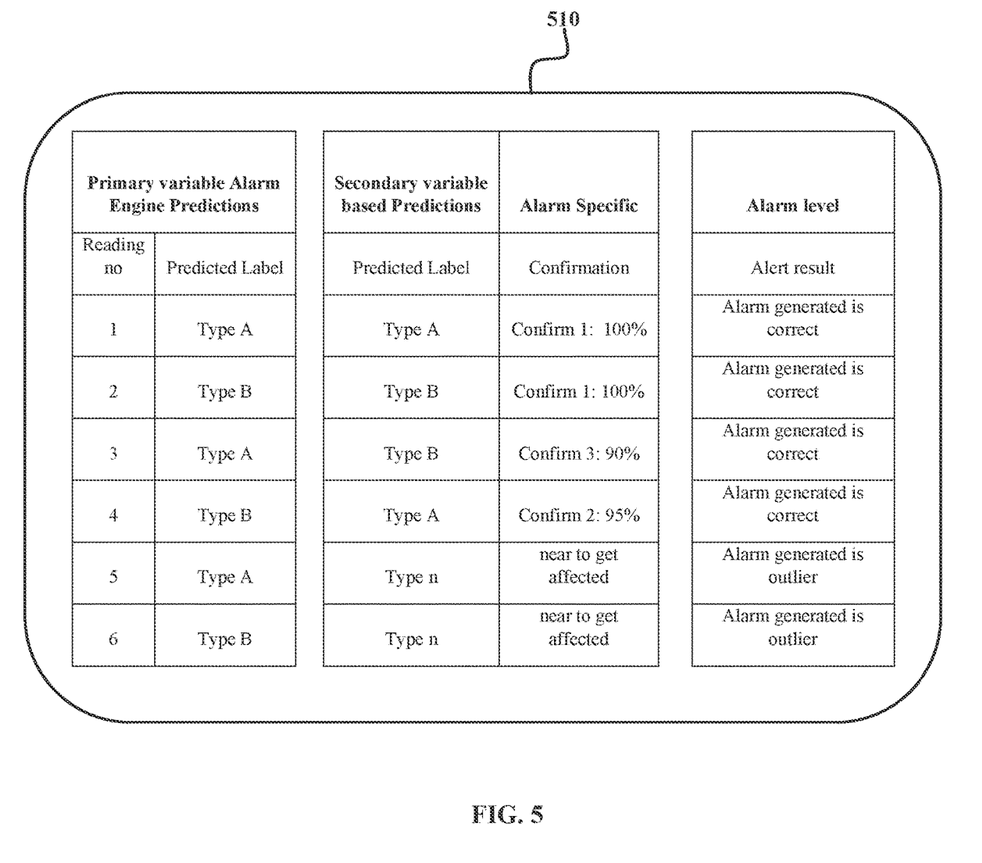
FIG. 5 shows a schematic diagram, illustrating primary variable and secondary variable predictions to confirm whether the alarm generated is correct or outlier, according to one or more embodiments.

FIG. 5 shows a schematic diagram, illustrating the primary variable and the secondary variable predictions 510 to confirm whether the alarm generated is correct or outlier, according to an embodiment of examples of this technology. According to an embodiment, whenever there is a problem in a machine, the alarms engine provides alarms based on the level of degradation of the issue.

If Type A (Primary variable)=Type A (Secondary variable), Confirm 1: effected (100% effected): Alarm generated is correct If Type B (Primary variable)=Type B (Secondary variable), Confirm 1: effected (100% effected): Alarm generated is correct If Type A (Primary variable)=Type B (Secondary variable), Confirm 3: effected (90% effected): Alarm generated is correct If Type B (Primary variable)=Type A (Secondary variable), Confirm 2: effected (95% effected): Alarm generated is correct If Type A (Primary variable)=Type n (Secondary variable), near to get affected: Alarm generated is outlier (Default programming)

If Type B (Primary variable)=Type n (Secondary variable), near to get affected: Alarm generated is outlier (Default programming), else display 0, no alarm generated.

The magnitude expressed is about match of the levels of alarms whether they match, and if they match what is the impact on degradation with respect to the variables values of both types of variables Type of relations considered:

Equal

Near to equal, neighboring values for issues Type A and Type B.

Not equal or far values

Figure 6:
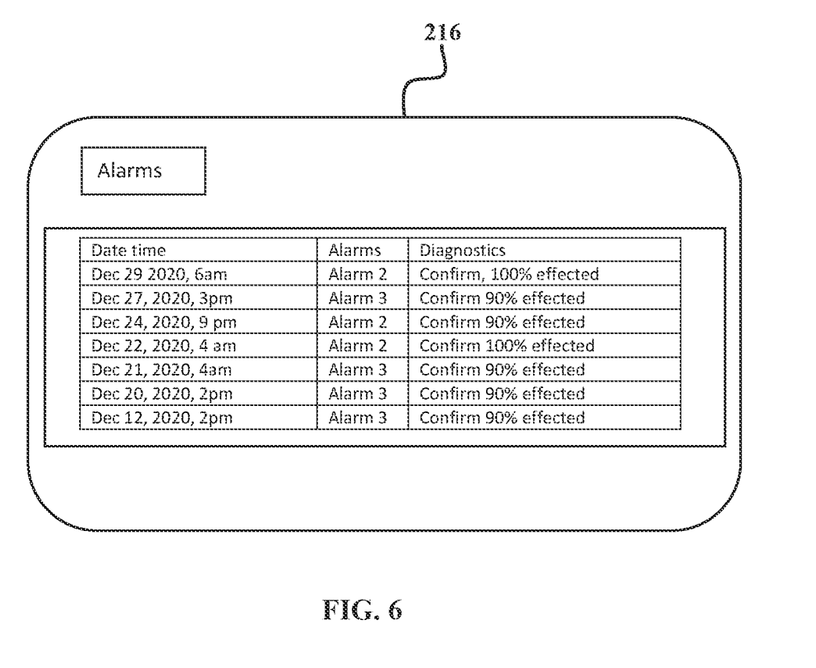
FIG. 6 shows a schematic diagram of the alarm's dashboard, according to one or more embodiments.

FIG. 6 shows a schematic diagram of the alarms dashboard 216, according to an embodiment of examples of this technology. The alarms data are displayed on the dashboard 216, so that the alarms can be notified to the right technicians, can be attained without any mismatch, as the cross-verification alarms are already done. The embodiments of examples of this technology reduces misclassification of alarm types based on predictive or preventive maintenance. It reduces the maintenance costs of assets by avoiding misclassification of alerts. It helps in prioritizing the critical alarms based on the alert type. The cross verification of alarms helps in sending the right alarm to right technician for maintenance.

Embodiments of examples of this technology disclose a computer program product for cross-verification of alarms in real-time, comprising at least one processor; and memory containing instructions, the instructions being executable by the at least one processor. The computer program product comprising receiving incident data from equipment for preventive and predictive maintenance of events, identifying one or more primary variables and one or more secondary variables causing the event based incident data. Labelling the one or more primary variables and one or more secondary variables by primary engine and secondary engine based on AI based predictive model building, predicting one or more label of one or more primary variables and one or more label of one or more secondary variables by one or more inference engine based on previous history and data patterns, triggering secondary engine for cross-verification of alarms whenever there is an alarm from the primary engine, identifying the correlation between one or more label from primary engine and one or more label form secondary engine by validation engine based on machine learning (ML), identifying alarm type based on correlation of labels, recommending predictive maintenance based on the identified alarm type, and displaying on the dashboard the cross-verification status of the alarms.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry, firmware, software or any combination of hardware, firmware, and software (e.g., embodied in a machine readable medium). For example, the various electrical structure and methods may be embodied using transistors, logic gates, and electrical circuits (e.g., application specific integrated (ASIC) circuitry and/or in Digital Signal Processor (DSP) circuitry).

In addition, it will be appreciated that the various operations, processes, and methods disclosed herein may be embodied in a machine-readable medium and/or a machine accessible medium compatible with a data processing system (e.g., a computer devices), and may be performed in any order (e.g., including using means for achieving the various operations). Various operations discussed above may be tangibly embodied on a medium readable through one or more processors. These input and output operations may be performed by a processor. The medium readable through the one or more processors may be, for example, a memory, a transportable medium such as a CD, a DVD, a Blu-ray™ disc, a floppy disk, or a diskette. A computer program embodying the aspects of the exemplary embodiments may be loaded onto the one or more processors. The computer program is not limited to specific embodiments discussed above, and may, for example, be implemented in an operating system, an application program, a foreground or background process, a driver, a network stack or any combination thereof. The computer program may be executed on a single computer processor or multiple computer processors.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for real-time cross-verification of alarms, the method comprising:
   receiving, by a processor, incident data from at least one equipment for preventive and predictive maintenance of one or more events;
   identifying, by the processor, one or more primary variables and one or more secondary variables causing the one or more events based on the incident data;
   labelling, by the processor, the one or more primary variables by a primary engine and the one or more secondary variables by a secondary engine using Artificial Intelligence (AI) based predictive model building;
   predicting, by the processor, one or more primary labels and one or more secondary labels by one or more inference engines based on previous history and data patterns;
   triggering, by the processor, the secondary engine for cross-verification of the alarms, if there are one or more primary labels predictions;
   identifying, by the processor, a correlation between the one or more primary labels and the one or more secondary labels by a validation engine;
   identifying, by the processor, an alarm type based on the correlation of the one or more primary labels and the one or more secondary labels;
   triggering, by the processor, a predictive maintenance recommendation based on the identified alarm type; and
   displaying, by the processor on a dashboard, the cross-verification status of the alarms.

2. The method as claimed in claim 1, wherein the one or more primary variables and the one or more secondary variables are input to the primary engine and the secondary engine for predicting the alarms.

3. The method as claimed in claim 1, wherein the one or more events are caused directly based on the one or more primary variables.

4. The method as claimed in claim 1, wherein the one or more secondary variables are responsible for asset degradation with lesser magnitude compared to the one or more primary variables.

5. The method as claimed in claim 1, wherein identifying the one or more primary variables and the one or more secondary variables further comprises:
   extracting, by the processor, the incident data causing each of the one or more events;
   identifying, by the processor, the one or more data patterns associated with the incident data using an ML technique;
   identifying, by the processor, a contribution of one or more extracted variables to each of the one or more events based on a regression method; and
   identifying, by the processor, a correlation between the one or more extracted variables.

6. The method as claimed in claim 5, wherein identifying the correlation between the one or more extracted variables comprises:
   identifying as one or more primary variables, by the processor, if the correlation of the one or more extracted variables related to the event is in a high range based on a data pattern;
   identifying as one or more secondary variables, by the processor, if the correlation of the one or more extracted variables related to the event is in a mid-range based on the data pattern; and
   ignoring the one or more extracted variables, by the processor, if the correlation of the one or more extracted variables related to the event is in proximity to a high range based on the data pattern.

7. The method as claimed in claim 5, wherein the correlation is identified by a snowball effect and is configurable based on the one or more events.

8. The method as claimed in claim 1, wherein the one or more primary variables and the one or more secondary variables are labelled in to one or more variable types, and wherein the one or more variable types are configured based on the one or more primary variables and the one or more secondary variables.

9. The method as claimed in claim 1, wherein the one or more primary variables and the one or more secondary variables are added to generate one or more values, wherein the one or more values are configured based on the one or more events.

10. The method as claimed in claim 9, wherein the one or more values define a status of the at least one equipment, wherein the definition comprises:
    one or more of 'switched OFF', 'standby mode', and 'below normal working range', if the variable value is '0';
    one or more of 'normal' and 'working range', if the variable value is '1', and
    one or more of 'above working range' and 'error', if the variable value is '2'.

11. The method as claimed in claim 1, wherein the one or more inference engines comprise:
    a first inference engine for:
      receiving predictions from the primary engine,
      verifying the one or more events based on historic predictions and the data patterns,
      identifying outliers and the alarms, triggering the secondary engine for cross verification of the alarms, and
recommending maintenance activity based on the outliers and alarms;
a second inference engine, for:
receiving predictions from the secondary engine, verifying the one or more events based on the historic predictions and the data patterns,
identifying outliers and the alarms, and
recommending maintenance activity based on the outliers and the alarms; and the validation engine for cross-verification of the alarms.

12. The method as claimed in claim 1, further comprising:
receiving, by the processor, input from a first inference engine;
receiving, by the processor, input from a second inference engine;
comparing, by the processor, the label predictions of the one or more primary variables with the label predictions of the one or more secondary variables;
identifying, by the processor, a pay off by comparing the one or more primary labels with the one or more secondary labels based on a magnitude of impact;
cross-verification of alarms, by the processor, based on a conditional probability using Nash Equilibrium, and
displaying, by the processor, status of the alarms on the dashboard using the validation engine.

13. A system for real-time cross-verification of alarms, the system comprising:
at least one processor;
a memory containing instructions, the instructions being executable by the at least one processor; and
a receiving module for receiving incident data from at least one equipment for preventive and predictive maintenance of one or more events;
a variables correlation module for identifying one or more primary variables and one or more secondary variables causing the one or more events based on the incident data;
a primary engine and a secondary engine for labelling the one or more primary variables and the one or more secondary variables using AI based predictive model building;
a first inference engine and a second inference engine for predicting one or more labels of the one or more primary variables and the one or more labels of the one or more secondary variables based on previous history and data patterns, wherein the primary engine triggers the secondary engine for cross-verification of the alarms whenever there is a prediction from the primary engine; and
a validation engine for:
identifying the correlation between the one or more label from the primary engine and the one or more label from the secondary engine,
identifying a type of alarm based on correlation of the labels,
recommending predictive maintenance based on the identified type of alarm; and a dashboard for displaying a status of the alarms after cross-verification.

14. A computer-readable storage device storing instructions that, when executed by a processor, cause the processor to perform operations, comprising:
receiving incident data from at least one equipment for preventive and predictive maintenance of one or more events;
identifying one or more primary variables and one or more secondary variables causing the one or more events based on the incident data;
labelling the one or more primary variables by a primary engine and the one or more secondary variables by a secondary engine using Artificial Intelligence (AI) based predictive model building;
predicting one or more primary labels and one or more secondary labels by one or more inference engines based on previous history and data patterns;
triggering the secondary engine for cross-verification of the alarms, if there are one or more primary labels predictions;
identifying a correlation between the one or more primary labels and the one or more secondary labels by a validation engine;
identifying an alarm type based on the correlation of the one or more primary labels and the one or more secondary labels;
triggering a predictive maintenance recommendation based on the identified alarm type; and
displaying on a dashboard, the cross-verification status of the alarms.

* * * * *